United States Patent [19]

Shimura et al.

[11] Patent Number: 4,992,664
[45] Date of Patent: Feb. 12, 1991

[54] RADIATION IMAGE READ-OUT, PROCESSING AND REPRODUCING METHODS

[75] Inventors: Kazuo Shimura; Yuuma Adachi, both of Kanagawa, Japan

[73] Assignee: Fuji Photo Film Co., Ltd., Kanagawa, Japan

[21] Appl. No.: 324,788

[22] Filed: Mar. 17, 1989

[30] Foreign Application Priority Data

Mar. 19, 1988 [JP] Japan ................................. 63-66756
Aug. 1, 1988 [JP] Japan ................................. 63-192372

[51] Int. Cl.$^5$ ........................ A61B 6/00; G01N 23/04
[52] U.S. Cl. ............................... 250/327.2; 250/484.1
[58] Field of Search ................. 250/327.2 C, 327.2 G, 250/484.1 B; 364/413.13; 382/47

[56] References Cited

U.S. PATENT DOCUMENTS 4,864,413  9/1989  Sasaki ..................................... 382/47

OTHER PUBLICATIONS

Titeno et al *Computed Radiography* Springer-Verlag (N.Y.) (1987) p. 140.

Primary Examiner—Jack I. Berman
Assistant Examiner—Richard Hanig
Attorney, Agent, or Firm—Sughrue, Mion, Zinn, Macpeak & Seas

[57] ABSTRACT

In a radiation image recording and reproducing system for recording a radiation image of an object on a recording medium, obtaining an image signal by reading out the radiation image and sampling the image information read out, carrying out image processing of the image signal, and reproducing a visible image from the processed image signal, a radiation image read-out method comprises the steps of changing the sampling density in accordance with characteristics of the recorded radiation iamge. A radiation image processing method comprises the steps of changing the magnification of the visible image in accordance with characteristics of the recorded radiation image. A radiation image reproducing method comprises the steps of changing the reproducing density, the number of visible images reproduced on a single recording sheet or the number of recoridng sheets, on which the visible image reproduced, in accordance with characteristics of the recorded radiation image.

13 Claims, 4 Drawing Sheets

RADIATION IMAGE READ-OUT, PROCESSING AND REPRODUCING METHODS

BACKGROUND OF THE INVENTION

1. Field of the Invention

This invention relates to a radiation image recording and reproducing system for recording a radiation image of an object on a recording medium, obtaining an image signal by reading out the radiation image from the recording medium, carrying out image processing of the image signal, and reproducing a visible image from the processed image signal.

2. Description of the Prior Art

Techniques for reading out a recorded radiation image in order to obtain an image signal, carrying out appropriate image processing on the image signal, and then reproducing a visible image by use of the processed image signal have heretofore been known in various fields. For example, as disclosed in Japanese Patent Publication No. 61(1986)-5193, an X-ray image is recorded on an X-ray film having a small gamma value designed so as to match the type of image processing to be carried out, the X-ray image is read out from the X-ray film and converted into an electric signal, and the electric signal (image signal) is processed and then used for reproducing the X-ray image as a visible image on a copy photograph or the like. In this manner, a visible image having good image quality with high contrast, high sharpness, high graininess or the like can be reproduced.

Also, when certain kinds of phosphors are exposed to radiation such as X-rays, $\alpha$-rays, $\beta$-rays, $\gamma$-rays, cathode rays or ultraviolet rays, they store part of the energy of the radiation. Then, when the phosphor which has been exposed to the radiation is exposed to stimulating rays such as visible light, light is emitted by the phosphor in proportion to the amount of energy stored during exposure to the radiation. A phosphor exhibiting such properties is referred to as a stimulable phosphor. As disclosed in U.S. Pat. Nos. 4,258,264, 4,276,473, 4,315,318 and 4,387,428 and Japanese Unexamined Patent Publication No. 56(1981)-11395, it has been proposed to use stimulable phosphors in radiation image recording and reproducing systems. Specifically, a sheet provided with a layer of the stimulable phosphor (hereinafter referred to as a stimulable phosphor sheet) is first exposed to radiation which has passed through an object such as the human body in order to store a radiation image of the object thereon, and is then scanned with stimulating rays, such as a laser beam, which cause it to emit light in proportion to the amount of energy stored during exposure to the radiation. The light emitted by the stimulable phosphor sheet upon stimulation thereof is photoelectrically detected and converted into an electric image signal, and by using the image signal the radiation image of the object is reproduced as a visible image on a recording material such as a photographic film, a display device such as a cathode ray tube (CRT), or the like.

Radiation image recording and reproducing systems which use stimulable phosphor sheets are advantageous over conventional radiography using silver halide photographic materials in that images can be recorded even when the energy intensity of the radiation to which the stimulable phosphor sheet is exposed varies over a wide range. More specifically, since the amount of light emitted upon stimulation after the radiation energy is stored on the stimulable phosphor varies over a wide range and is proportional to the amount of energy stored during exposure to the radiation, it is possible to obtain an image having a desirable density regardless of the energy intensity of the radiation to which the stimulable phosphor sheet was exposed, by setting an appropriate read-out gain when detecting the emitted light and converting it into an electric signal to be used in reproducing a visible image on a recording material or a display device.

The aforesaid radiation image recording and reproducing systems are often used for making a medical diagnosis of a human body, and are therefore required to reproduce a visible image suitable for viewing and diagnostic purposes. What characteristics the visible image should have in order that it be suitable for diagnostic purposes, for example, what type of image reproduction is suitable for diagnosis, varies depending on specific purposes of diagnosis.

Therefore, an image signal should be detected or treated in the read-out step for obtaining the image signal by reading out a radiation image recorded on a recording medium, the image processing step for carrying out image processing of the image signal, and the reproduction step for reproducing a visible image from the processed image signal so as to obtain a better visible image in accordance with specific purposes of diagnosis.

SUMMARY OF THE INVENTION

The primary object of the present invention is to provide a radiation image read-out method for use in a radiation image recording and reproducing system, which provides a visible image suitable for specific purposes of diagnosis.

Another object of the present invention is to provide a radiation image processing method for use in a radiation image recording and reproducing system, which provides a visible image suitable for specific purposes of diagnosis.

A further object of the present invention is to provide a radiation image reproducing method for use in a radiation image recording and reproducing system, which provides a visible image suitable for specific purposes of diagnosis.

The present invention provides a radiation image read-out method for use in a radiation image recording and reproducing system for recording a radiation image of an object on a recording medium, obtaining an image signal by reading out the radiation image from the recording medium and sampling the image information which has been read out, carrying out image processing of the image signal, and reproducing a visible image from the processed image signal,     the radiation image read-out method comprising the steps of changing the sampling density in accordance with characteristics of the recorded radiation image.

The present invention also provides a radiation image processing method for use in the radiation image recording and reproducing system described above,     the radiation image processing method comprising the steps of changing the magnification of said visible image with respect to the recorded radiation image in accordance with characteristics of the recorded radiation image.

The present invention further provides a radiation image reproducing method for use in the radiation image recording and reproducing system described above, the radiation image reproducing method comprising the steps of changing the reproducing density in accordance with characteristics of the recorded radiation image.

The present invention still further provides a radiation image reproducing method for use in the radiation image recording and reproducing system described above, the radiation image reproducing method comprising the steps of determining the number of visible images, which are to be reproduced on a single recording sheet, in accordance with characteristics of the recorded radiation image.

The present invention also provides a radiation image reproducing method for use in the radiation image recording and reproducing system described above, the radiation image reproducing method comprising the steps of determining the number of recording sheets, on which said visible image is to be reproduced, in accordance with characteristics of the recorded radiation image.

The term "characteristics of a recorded radiation image" as used herein means, for example, what portion of an object is represented by the recorded radiation image and what mode was used when the radiation image was recorded.

The term "obtaining an image signal by reading out a radiation image from a recording medium and sampling the image information which has been read out" embraces, for example, the cases where a digital image signal is obtained by first detecting an analog signal which represents a radiation image and then sampling and digitizing the analog signal, and the cases where read out and sampling are carried out simultaneously by use of a charge coupled device (CCD), a MOS sensor, or the like.

In preferred embodiments of the radiation image read-out method, the radiation image processing method and the radiation image reproducing methods in accordance with the present invention, light which is emitted by a recording medium and which represents a radiation image is detected photoelectrically, and the signal thus obtained is sampled in order to obtain the image signal. The term "light which is emitted by a recording medium and which represents a radiation image" as used herein embraces light emitted by a stimulable phosphor sheet when it is exposed to stimulating rays, light passing through a sheet of photographic film, and light reflected by a sheet of photographic film.

With the radiation image read-out method in accordance with the present invention, the sampling density, i.e. the number of sampling points at which the image information which has been read out is sampled per unit area of a recording medium, is changed in accordance with characteristics of the recorded radiation image. Therefore, in cases where it is only necessary for a diagnosis that the radiation image be ascertained approximately, the sampling density may be decreased. In this manner, the number of components of the image signal can be reduced, the capacity of storing the image signal can be decreased, and the speed at which image processing is carried out can be increased.

With the radiation image processing method in accordance with the present invention, the magnification of the visible image with respect to the recorded radiation image is changed in accordance with characteristics of the recorded radiation image. Therefore, a visible image having the same size as the object can be reproduced in order to measure dimensions of the object. In cases where the purposes of diagnosis can be achieved with a reduced image, a reduced visible image can be reproduced by changing the magnification. In this manner, the size of a recording sheet on which the visible image is to be reproduced can be reduced, and the space required to store the reproduced visible image can be decreased.

With the first radiation image reproducing method in accordance with the present invention, the reproducing density, i.e. the number of reproduction points at which image information is reproduced per unit area of a recording sheet, is changed in accordance with characteristics of the recorded radiation image. Therefore, the reproducing density can be increased in order to reproduce a visible image more accurately. Also, in cases where it is only necessary for a diagnosis that the radiation image be ascertained approximately, the reproducing density may be decreased in order to shorten the time required for the visible image to be reproduced.

The change of the reproducing density and the change of the sampling density may be combined with the change of the magnification of the visible image. The change of the magnification of the visible image is also possible in the image processing step.

With the second radiation image reproducing method, the number of visible images which are to be reproduced on a single recording sheet is determined in accordance with characteristics of the recorded radiation image. Therefore, for example, an image of the frontal chest of a human body and an image of the side of the chest can be reproduced on a single recording sheet in order to diagnose the chest collectively. Alternatively, two images obtained by differently processing a single radiation image of the frontal chest of a human body can be reproduced on a single recording sheet. In this manner, visible images suitable for specific purposes of diagnosis can be reproduced.

With the third radiation image reproducing method in accordance with the present invention, the number of recording sheets on which the visible image is to be reproduced is determined in accordance with characteristics of the recorded radiation image. Therefore, a plurality of visible images can be viewed simultaneously at different locations.

The characteristics of the recorded radiation image, for example, what portion of an object is represented by the recorded radiation image and what mode was used when the radiation image was recorded, are determined in accordance with specific purposes of diagnosis. Therefore, parameters such as the sampling density and the magnification of the visible image can be determined on the basis of the characteristics of the recorded radiation image.

In cases where the object is a human body, the term "portion of an object represented by a recorded radiation image" means, for example, the head, the chest or the abdomen. This term also means the whole head, an eyeball, the nose, a bone, an ear or the like. It also means the front part or the side part of the head, or the like. The term "mode used when a radiation image was recorded" as used herein means, for example, an ordinary image recording mode, a contrasted image recording mode, or an enlarged image recording mode.

The radiation image read-out method, the radiation image processing method and the radiation image reproducing methods in accordance with the present invention may be combined so that, for example, the sampling density and the magnification of the visible image are associated with each other.

When the radiation image read-out method, the radiation image processing method and the radiation image reproducing methods in accordance with the present invention are carried out, information about the characteristics of the recorded radiation image, for example, what portion of an object is represented by the recorded radiation image and what mode was used when the radiation image was recorded, may be fed directly into apparatuses which constitute the radiation image recording and reproducing system. Alternatively, for example, the sampling density, the magnification of the visible image and the like may be determined on the basis of the characteristics of the recorded radiation image, and information about the determined sampling density, the determined magnification of the visible image and the like may be fed into the apparatuses which constitute the radiation image recording and reproducing system.

When various parameters are changed in accordance with the characteristics of the recorded radiation image, a visible image suitable for specific purposes of diagnosis can be reproduced.

DESCRIPTION OF THE PREFERRED EMBODIMENTS

The present invention will hereinbelow be described in further detail with reference to the accompanying drawings.

Figure 6:
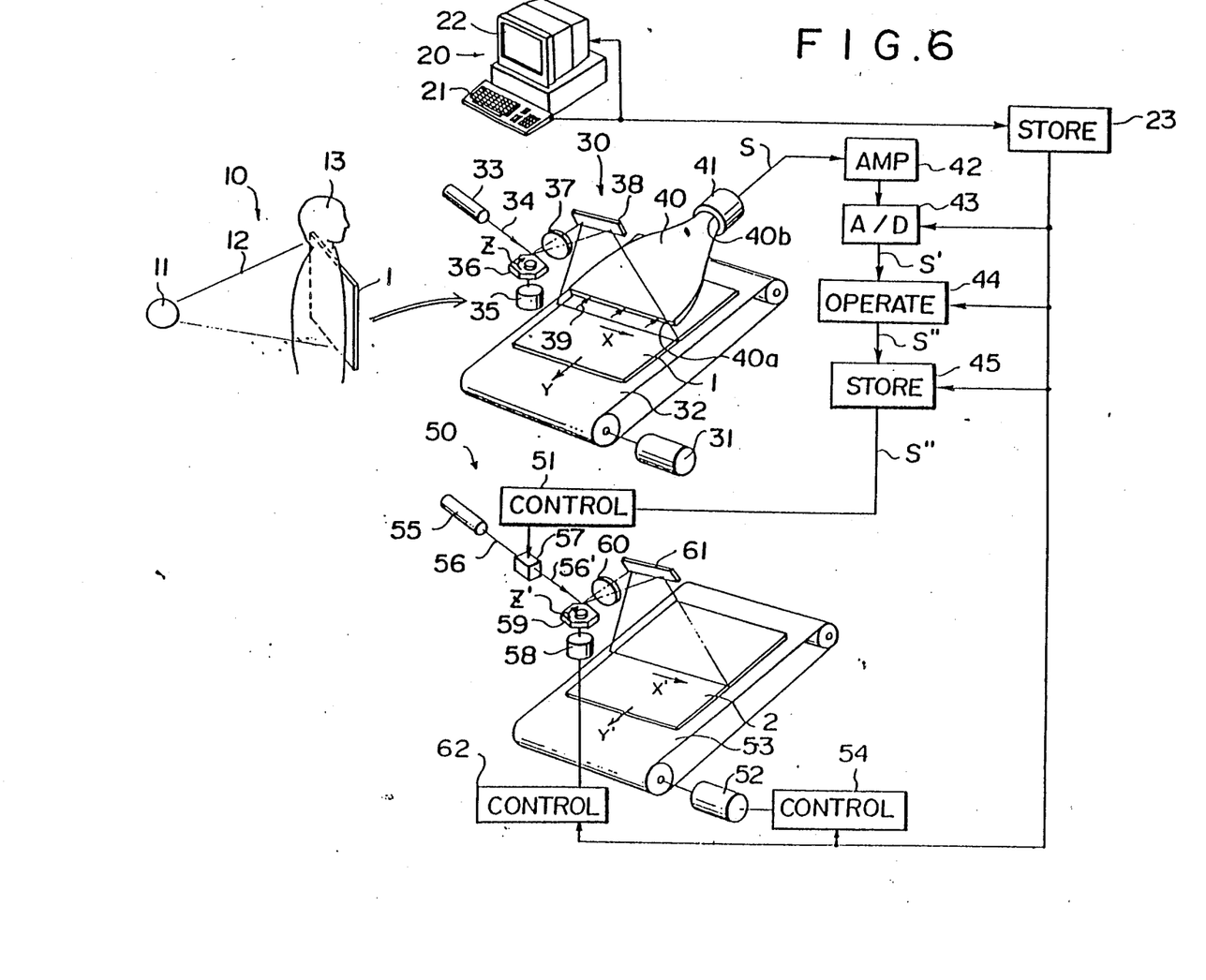
FIG. 6 is a perspective view showing an example of the radiation image recording and reproducing system wherein an embodiment of the radiation image read-out method in accordance with the present invention, an embodiment of the radiation image processing method in accordance with the present invention, and/or an embodiment of the radiation image reproducing method in accordance with the present invention is employed.

With reference to FIG. 6, a radiation image recording and reproducing system utilizes a stimulable phosphor sheet for recording a radiation image.

In an image recording apparatus 10, radiation 12 produced by a radiation source 11 is caused to pass through an object 13 and impinge upon a stimulable phosphor sheet 1 which serves as a recording medium. A stimulable phosphor of which the stimulable phosphor sheet 1 is constituted stores energy in proportion to the radiation dose, and therefore a radiation image of the object 13 is stored on the stimulable phosphor sheet 1.

On the other hand, ID information giving specifics about the object 13, such as the name of the object 13, and characteristics of the recorded radiation image are entered from a keyboard 21 of a recorded-image characteristics input device 20. The characteristics of the recorded radiation image include what portion of the object 13 is represented by the recorded radiation image (e.g. the frontal chest) and what mode was used when the radiation image was recorded (e.g. a contrasted image recording mode). For simplicity of explanation, the ID information is also called the characteristics of the recorded radiation image. The entered characteristics of the recorded radiation image are stored in a recorded-image characteristics storage section 23. A CRT display device 22 is used to confirm the characteristics of the recorded radiation image which have been entered from the keyboard 21.

The stimulable phosphor sheet 1 on which the radiation image has been stored is placed at a predetermined position in a read-out apparatus 30. The stimulable phosphor sheet 1 is conveyed in a sub-scanning direction indicated by the arrow Y by a sheet conveyance means 32 which is constituted of an endless belt or the like and which is operated by a motor 31. On the other hand, stimulating rays 34 which are produced by a laser beam source 33 are reflected and deflected by a rotating polygon mirror 36 which is being quickly rotated by a motor 35 in the direction indicated by the arrow Z, and are caused to pass through a converging lens 37 constituted of an fθ lens or the like. The direction of the optical path of the stimulating rays 34 is then changed by a mirror 38, and the stimulating rays 34 are caused to impinge upon the stimulable phosphor sheet 1 and scan it in a main scanning direction which is indicated by the arrow X and which is approximately normal to the sub-scanning direction indicated by the arrow Y. When the stimulable phosphor sheet 1 is exposed to the stimulating rays 34, the exposed portion of the stimulable phosphor sheet 1 emits light 39 in an amount proportional to the amount of energy stored during exposure to radiation. The emitted light 39 is guided by a light guide member 40, and photoelectrically detected by a photomultiplier 41 which acts as a photodetector. The light guide member 40 is made by forming a light guiding material such as an acrylic plate, and has a linear light input face 40a extending along the main scanning line on the stimulable phosphor sheet 1, and a ring-shaped light output face 40b positioned in close contact with a light receiving face of the photomultiplier 41. The emitted light 39 which has entered the light guide member 40 from its light input face 40a is guided through repeated total reflection inside of the light guide member 40, emanates from the light output face 40b, and is detected by the photomultiplier 41. In this manner, the amount of the emitted light 39 carrying the radiation image is converted into an electric signal by the photomultiplier 41.

An analog output signal S generated by the photomultiplier 41 is amplified by an amplifier 42. The amplified signal is sampled and digitized with a predetermined scale factor by an A/D converter 43. In this manner, a digital image signal S' is obtained. During the sampling, sampling clocks are changed in accordance with the characteristics of the recorded radiation image which are read from the recorded-image characteristics storage section 23. As a result, the sampling density is changed.

Figure 1A:
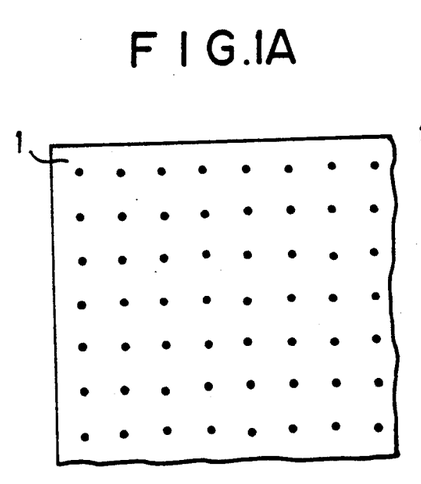
FIGS. 1A and 1B are explanatory views showing parts of stimulable phosphor sheets on which centers of read-out picture elements are indicated by dots.
Figure 1B:
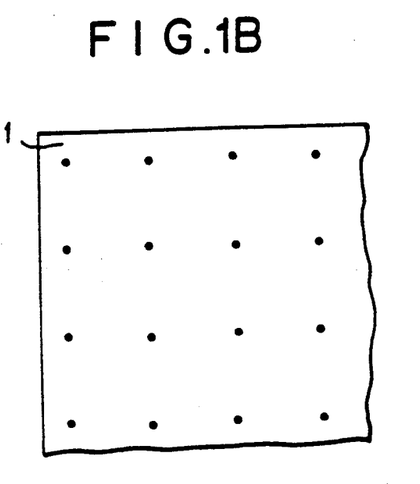

With reference to FIGS. 1A and 1B, dots indicate the centers of read-out picture elements on the stimulable phosphor sheet 1. The radiation image is read out at intervals among the dots. In FIG. 1A, the dots are two-dimensionally located at a high density, and therefore the sampling density is high. In FIG. 1B, the density at which the dots are located are lower than in FIG. 1A, and therefore the sampling density is low.

The sampling density is changed in accordance with the characteristics of the recorded radiation image which have been entered from the recorded-image characteristics input device 20 shown in FIG. 6. Therefore, in cases where it is only necessary that the radiation image be ascertained approximately by way of example, the number of components of the image signal which is to be processed can be reduced, the space of a memory required for storing the image signal can be reduced, and a larger number of image signals can be stored in the memory. Also, the speed at which the image signal is processed can be increased.

The digital image signal S' generated by the A/D converter 43 shown in FIG. 6 is fed into an operating section 44. The operating section 44 carries out appropriate image processing on the digital image signal S' so that a visible image suitable for viewing, particularly for diagnostic purposes, is reproduced in accordance with specific purposes of diagnosis.

In the course of the image processing, the characteristics of the recorded radiation image which are stored in the recorded-image characteristics storage section 23 are fed into the operating section 44. The operating section 44 carries out an interpolation operating process or the like in order to determine the size of a visible image, which is to be reproduced, in accordance with the characteristics of the recorded radiation image. In the image processing, the sampling density described above and a reproducing density which will be described later are taken into consideration when the size of the visible image is determined.

Figure 2A:
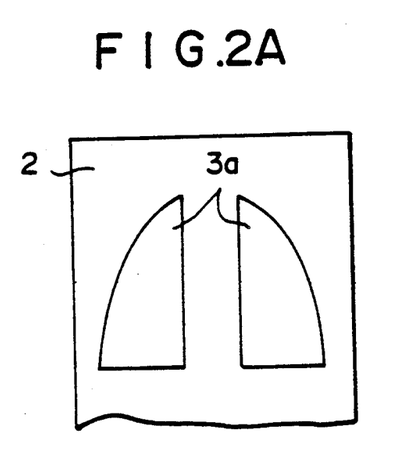
FIGS. 2A and 2B are explanatory views showing sheets of photographic film on which visible images have been reproduced at different magnifications.
Figure 2B:
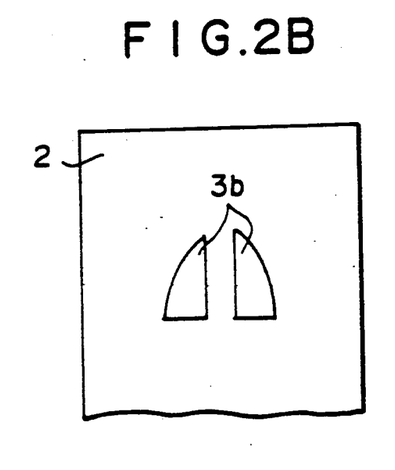

FIGS. 2A and 2B show the states of visible images 3a and 3b reproduced on sheets of photographic film (recording sheets) 2, 2 in a reproducing apparatus 50 which will be described later. The visible image 3b is reduced as compared with the visible image 3a.

In cases where the magnification of the visible image is changed in accordance with the characteristics of the recorded radiation image, a visible image having the same size as the portion of the object represented by the recorded radiation image can be obtained when necessary, and dimensions of the object portion can be measured Alternatively, an enlarged visible image can be obtained in order to view the details thereof. In cases where the purposes of diagnosis can be achieved with a reduced visible image, the visible image can be reproduced with a reduced scale. Therefore, the area of the photographic film 2 required to reproduce the visible image can be reduced, and the space required to store the photographic film 2 on which the visible image has been reproduced can be decreased.

The operating section 44 carried out image processing as described above and generates an image signal S". The image signal S" is stored in an image signal storage section 45, and then fed into an AOM control section 51 of the reproducing apparatus 50.

In the reproducing apparatus 50, photographic film (a recording sheet) 2 is conveyed in the direction indicated by the arrow Y' by a sheet conveyance means 53 which is constituted of an endless belt or the like and which is operated by a conveyance motor 52. The rotation speed of the conveyance motor 52 is controlled by a conveyance motor control section 54. The conveyance motor control section 54 receives the characteristics of the recorded radiation image from the recorded-image characteristics storage section 23, and controls the speed at which the photographic film 2 is conveyed in the direction indicated by the arrow Y' in accordance with the characteristics of the recorded radiation image. On the other hand, a reproducing light 56 is produced by a laser beam source 55, and is modulated by an acousto-optic modulator (AOM) 57 in accordance with the image signal S" which is fed from the image signal storage section 45 into the AOM control section 51.

The modulated reproducing light 56' is reflected and deflected by a rotating polygon mirror 59 which is being rotated quickly in the direction indicated by the arrow Z' by a motor 58 controlled by a motor control section 62. The reproducing light 56' is then caused to pass through a converging lens 60 constituted of an fθ lens or the like. The direction of the optical path of the reproducing light 56' is then changed by a mirror 61, and the the reproducing light 56' is caused to impinge upon the photographic film 2 and scan it in a direction which is indicated by the arrow X' and which is approximately normal to the direction of conveyance indicated by the arrow Y'. In this manner, a visible image is reproduced on the photographic film 2 from the image signal S".

The motor control section 62 is connected to the recorded-image characteristics storage section 23, and receives the characteristics of the recorded radiation image therefrom. The motor control section 62 determines the rotation speed of the motor 58 in accordance with the characteristics of the recorded radiation image. As a result, the speed at which the photographic film 2 is scanned with the reproducing light 56' in the direction indicated by the arrow X' is determined in accordance with the characteristics of the recorded radiation image.

The image processing carried out in the operating section 44, the speed at which the photographic film 2 is conveyed in the direction indicated by the arrow Y' and which is controlled by the conveyance motor control section 54, and the speed at which the photographic film 2 is scanned with the reproducing light 56' in the direction indicated by the arrow X' and which is controlled by the motor control section 62 define the magnification of the visible image, the reproducing density, and the number of visible images reproduced on a single recording sheet.

Figure 3A:
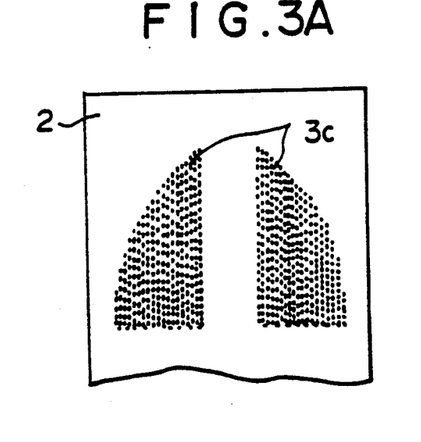
FIGS. 3A and 3B are explanatory views showing sheets of photographic film on which reproducing density of visible images is indicated by dots.
Figure 3B:
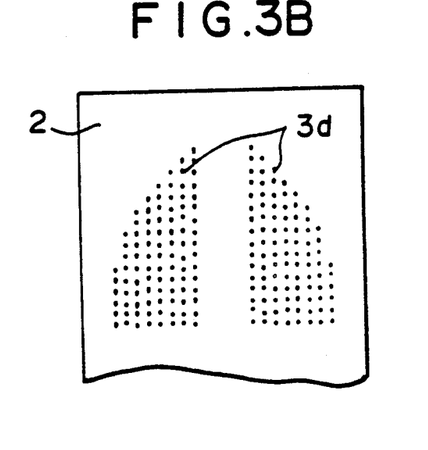

FIGS. 3A and 3B shows the reproducing density of visible images 3c and 3d reproduced on sheets of photographic film 2, 2 by means of the distributions of dots. The dots indicate the reproducing points at which the image information is reproduced. The visible image 3c is reproduced at a higher reproducing density than the visible image 3d. In cases where the reproducing density is changed in accordance with the characteristics of the recorded radiation image, a finer visible image can be reproduced when necessary in order to view details thereof. In cases where it is only necessary that the radiation image be ascertained approximately, the speed at which the photographic film 2 is conveyed in the direction indicated by the arrow Y' shown in FIG. 6 and the speed at which the photographic film 2 is scanned with the reproducing light 56' in the direction indicated by the arrow X' shown in FIG. 6 may be increased. As a result, the time required to reproduce the visible image can be shortened.

Figure 4:
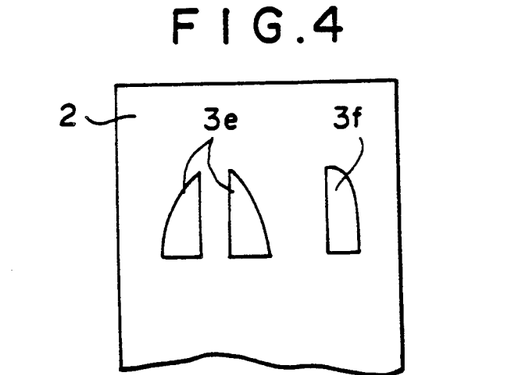
FIG. 4 is an explanatory view showing a single sheet of photographic film on which two visible images have been reproduced.

FIG. 4 shows visible images 3e and 3f which have been reproduced on a single sheet of photographic film 2. The visible image 3e represents the frontal chest, and the visible image 3f represents the side of the chest.

When the number of visible images reproduced on a single sheet of photographic film 2 is determined in accordance with the characteristics of the recorded radiation image, it is possible to obtain a plurality of visible images suitable for specific purposes of diagnosis, for example, for collectively viewing the visible images.

The sampling density, the magnification, the reproducing density, and the number of visible images reproduced on a single sheet of photographic film are associated with one another. For example, when a plurality of radiation images of the same object are recorded from various directions and compared with one another, the sampling density for each radiation image is decreased in the read-out apparatus 30, thereby to reduce the number of components of the image signal representing each radiation image, and a plurality of reduced visible images are reproduced on a single sheet of photographic film 2 in the reproducing apparatus 50.

Figure 5:
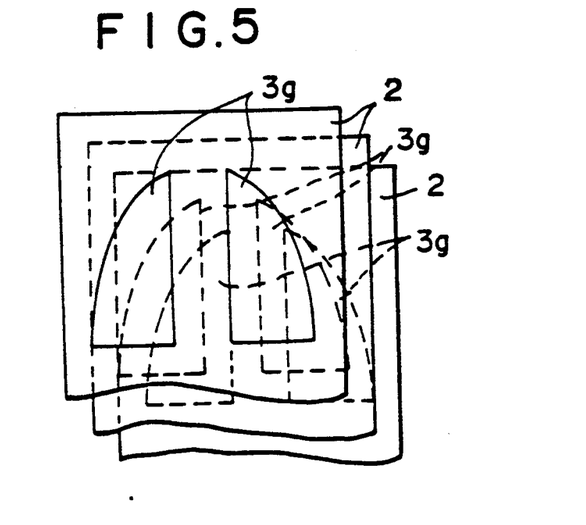
FIG. 5 is an explanatory view showing three sheets of photographic film on which the same visible image has been reproduced.

FIG. 5 shows three sheets of photographic film 2, 2, 2 on which the same visible images 3g, 3g, 3g have been reproduced. In this case, the sheets of photographic film 2, 2, 2 can be distributed to different locations, for example, to the internal department and the department of radiology of a hospital.

In order to reproduce a plurality of the same visible images in accordance with the characteristics of the recorded radiation image, the characteristics of the recorded radiation image are fed into the image signal storage section 45 of the read-out apparatus 30 shown in FIG. 6. After a visible image has been reproduced in the reproducing apparatus 50, the same image signal S" is again fed from the image signal storage section 45 into the AOM control section 51, and the reproducing light 56 is modulated so as to reproduce the same visible image. At the same time, the same characteristics of the recorded radiation image are fed into the conveyance motor control section 54 and the motor control section 62, so that the same visible image is reproduced.

The present invention is not limited to the aforesaid embodiments wherein a stimulable phosphor sheet is used, and is also applicable to, for example, an X-ray image recording and reproducing system wherein conventional X-ray film is used.

Figure 7:
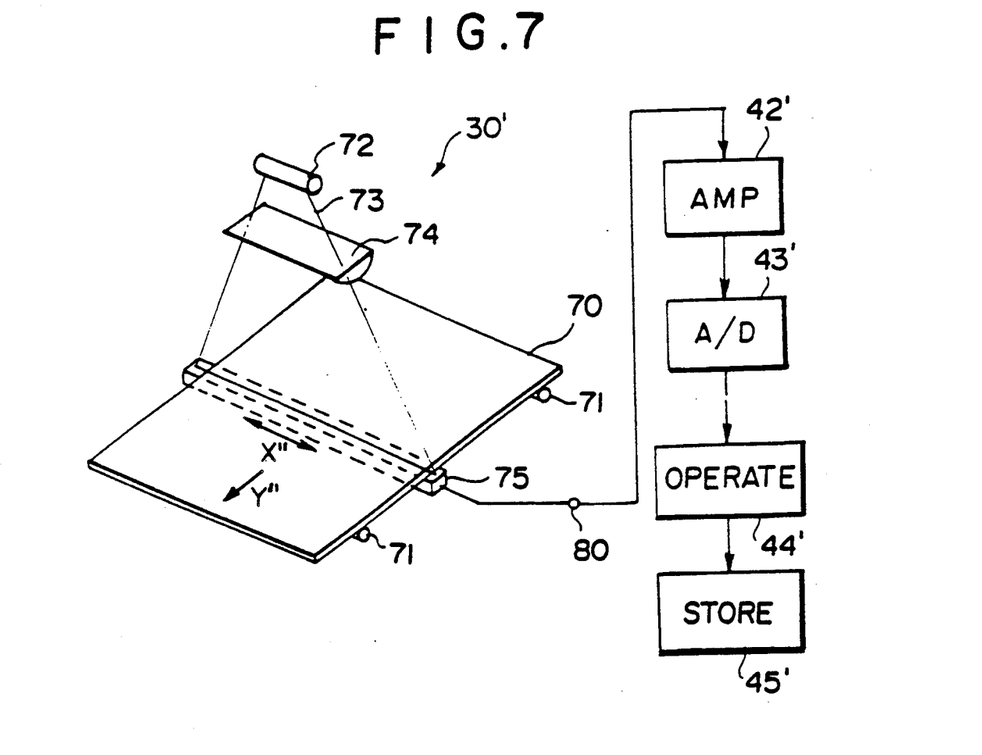
FIG. 7 is a perspective view showing an example of the X-ray image read-out apparatus for reading out an X-ray image recorded on a sheet of X-ray film.

FIG. 7 shows an example of an X-ray image read-out apparatus for reading out an X-ray image recorded on a sheet of X-ray film, which apparatus constitutes part of the X-ray image recording and reproducing system wherein conventional X-ray film is used.

With reference to FIG. 7, a sheet of X-ray film 70 has been subjected to an image recording operation in an image recording apparatus (not shown) which is of the same type as the image recording apparatus 10 shown in FIG. 6, and then subjected to development and fixing in a developing apparatus (not shown). The X-ray film 70 is placed at a predetermined position in a read-out apparatus 30', and is conveyed in the direction indicated by the arrow Y" by a film conveyance means 71.

Reading light 73 produced by an elongated light source 72 extending in one direction is converged by a cylindrical lens 74, and is linearly irradiated onto the X-ray film 70 along the directions indicated by the arrow X", which are approximately normal to the direction indicated by the arrow Y". A MOS sensor 75 is positioned below the X-ray film 70 so that the MOS sensor 75 can receive the reading light 73 which has passed through the X-ray film 70, the intensity of which light has been modulated in accordance with the X-ray image recorded on the X-ray film 70. The MOS sensor 75 comprises a plurality of solid state photoelectric conversion devices which are arrayed linearly at intervals equal to the intervals between the picture elements of the X-ray image along the directions indicated by the arrow X". As long as the X-ray film 70 is conveyed in the direction indicated by the arrow Y" while being exposed to the reading light 73, the MOS sensor 75 detects the reading light, which has passed through the X-ray film 70, at predetermined intervals corresponding to the intervals between the picture elements of the X-ray image along the direction indicated by the arrow Y".

Figure 8:
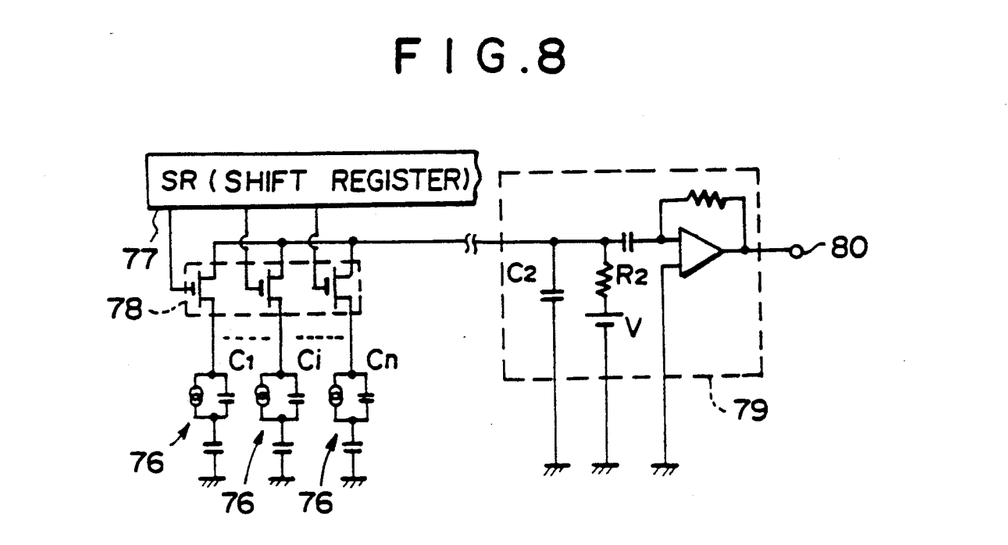
FIG. 8 is a circuit diagram showing an equivalent circuit for a MOS sensor.

FIG. 8 shows an equivalent circuit for the MOS sensor 75.

With reference to FIG. 8, photocarriers generated when the reading light 73 impinges upon the solid state photoelectric conversion devices 76, 76, ... accumulate in capacitors Ci (i=1, 2, ..., n) of the solid state photoelectric conversion devices 76, 76, ... The number of photocarriers which accumulate in the capacitors Ci is detected by sequentially turning on and off the switches of a switch section 78. A shift register 77 controls the switches of the switch section 78, and a time-serial image signal is obtained. The image signal is then amplified by a pre-amplifier 79 and is output at an output terminal 80 of the pre-amplifier 79.

The image signal output by the MOS sensor 75 is amplified by an amplifier 42', and digitized by an A/D converter 43'. The obtained digital image signal is fed into an operating section 44' and subjected to appropriate image processing. The processed image signal is stored in a storage section 45'. The A/D converter 43', the operating section 44' and the storage section 45' act in the same manner as the A/D converter 43, the operating section 44 and the image signal storage section 45 shown in FIG. 6. In this embodiment, the MOS sensor 75 may be replaced by a charge coupled device (CCD) or a charge priming device (CPD). Also, the X-ray image may be read out from the X-ray film 70 by two-dimensionally scanning the X-ray film 70 with a light beam in the same manner as that described above for image read-out from the stimulable phosphor sheet. Furthermore, instead of detecting light which has passed through the X-ray film 70, light reflected by the X-ray film 70 may be detected.

The present invention is applicable to various types of radiation image recording and reproducing systems for recording a radiation image of an object on a recording medium, obtaining an image signal by reading out the radiation image from the recording medium and sampling the image information which has been read out, carrying out image processing of the image signal, and reproducing a visible image from the processed image signal. For example, in cases where the image read-out operation is carried out photoelectrically, the term "reading out a radiation image and sampling image information which has been read out" as used herein embraces the cases where the image read-out operation and sampling are carried out simultaneously by use of an array of divided light receiving elements as in the case of the MOS sensor.

We claim:

1. A radiation image read-out method for use in a radiation image recording and reproducing system for recording a radiation image of an object on a recording medium, obtaining an image signal by reading out the radiation image from the recording medium and sampling the image information which has been read out, carrying out image processing of the image signal, and reproducing a visible image from the processed image signal, the radiation image read-out method comprising the steps of changing the sampling density in accordance with characteristics of the recorded radiation image.

2. A radiation image read-out method as defined in claim 1 wherein said characteristics of the recorded radiation image are composed of what portion of the object is represented by the recorded radiation image and what mode was used when the radiation image was recorded.

3. A radiation image read-out method as defined in claim 1 wherein said recording medium is a stimulable phosphor sheet on which a radiation image has been stored, and the radiation image is read out by scanning said stimulable phosphor sheet with stimulating rays, which cause said stimulable phosphor sheet to emit light in proportion to the amount of energy stored during exposure to radiation, and detecting the light emitted by said stimulable phosphor sheet.

4. A radiation image processing method for use in a radiation image recording and reproducing system for recording a radiation image of an object on a recording medium, obtaining an image signal by reading out the radiation image from the recording medium and sampling the image information which has been read out, carrying out image processing of the image signal, and reproducing a visible image from the processed image signal, the radiation image processing method, comprising the steps of determining an image processing condition and changing the magnification of said visible image with respect to the recorded radiation image in accordance with characteristics of the recorded radiation image.

5. A radiation image processing method as defined in claim 4 wherein said characteristics of the recorded radiation image are composed of what portion of the object is represented by the recorded radiation image and what mode was used when the radiation image was recorded.

6. A radiation image processing method as defined in claim 5, further comprising the step of inputting and storing characteristics of the recorded radiation image.

7. A radiation image processing method as defined in claim 4 wherein said recording medium is a stimulable phosphor sheet on which a radiation image has been stored, and the radiation image is read out by scanning said stimulable phosphor sheet with stimulating rays, which cause said stimulable phosphor sheet to emit light in proportion to the amount of energy stored during exposure to radiation, and detecting the light emitted by said stimulable phosphor sheet.

8. A radiation image reproducing method for use in a radiation image recording and reproducing system for recording a radiation image of an object on a recording medium, obtaining an image signal by reading out the radiation image from the recording medium and sampling the image information which has been read out, carrying out image processing of the image signal, and reproducing a visible image from the processed image signal, the radiation image reproducing method comprising the steps of changing the reproducing density in accordance with characteristics of the recorded radiation image.

9. A radiation image reproducing method as defined in claim 8 wherein said characteristics of the recorded radiation image are composed of what portion of the object is represented by the recorded radiation image and what mode was used when the radiation image was recorded.

10. A radiation image reproducing method as defined in claim 8 wherein said recording medium is a stimulable phosphor sheet on which a radiation image has been stored, and the radiation image is read out by scanning said stimulable phosphor sheet with stimulating rays, which cause said stimulable phosphor sheet to emit light in proportion to the amount of energy stored during exposure to radiation, and detecting the light emitted by said stimulable phosphor sheet.

11. A radiation image reproducing method for use in a radiation image recording and reproducing system for recording a radiation image of an object on a recording medium, obtaining an image signal by reading out the radiation image from the recording medium and sampling the image information which has been read out, carrying out image processing of the image signal, and reproducing a visible image from the processed image signal, the radiation image reproducing method comprising the steps of determining an image processing condition, and the number of visible images which are to be reproduced on a single recording sheet, in accordance with characteristics of the recorded radiation image.

12. A radiation image reproducing method as defined in claim 11 wherein said characteristics of the recorded radiation image are composed of what portion of the object is represented by the recorded radiation image and what mode was used when the radiation image was recorded.

13. A radiation image reproducing method as defined in claim 11 wherein said recording medium is a stimulable phosphor sheet on which a radiation image has been stored, and the radiation image is read out by scanning said stimulable phosphor sheet with stimulating rays, which cause said stimulable phosphor sheet to emit light in proportion to the amount of energy stored during exposure to radiation, and detecting the light emitted by said stimulable phosphor sheet.

* * * * *